United States Patent [19]
Franchak

[11] Patent Number: 5,988,744
[45] Date of Patent: Nov. 23, 1999

[54] BABY SAFETY SEAT

[76] Inventor: Lynn Franchak, R.R. 2 Box 642-D, Hamburg, N.J. 07419

[21] Appl. No.: 08/294,958

[22] Filed: Aug. 24, 1994

[51] Int. Cl.⁶ .................................................. A47D 15/00
[52] U.S. Cl. .............................. 297/256.17; 297/219.12; 297/468
[58] Field of Search ............................ 297/256.17, 467, 297/250.1, 219.12, 229, 468, 255, 238, 258

[56] References Cited

U.S. PATENT DOCUMENTS

| D. 296,730 | 7/1998 | Fetterman . | |
|---|---|---|---|
| D. 342,835 | 1/1994 | Minkn . | |
| 2,652,183 | 9/1953 | Hlivka | 297/467 X |
| 2,667,917 | 2/1954 | Dustin | 297/468 X |
| 2,716,561 | 8/1955 | Beran | 297/468 |
| 4,108,489 | 8/1978 | Salzman . | |
| 4,139,131 | 2/1979 | Hathaway | 297/467 X |
| 4,568,125 | 2/1986 | Sckolnik | 297/467 |
| 5,121,965 | 6/1992 | Skold . | |
| 5,178,309 | 1/1993 | Bicheker et al. . | |
| 5,224,756 | 7/1993 | Dukatz et al. | 297/238 |
| 5,354,121 | 10/1994 | Allum | 297/488 X |

FOREIGN PATENT DOCUMENTS

| 214350 | 1/1957 | Australia | 297/484 |
|---|---|---|---|
| 2707568 | 1/1995 | France | 297/250.1 |
| 1519793 | 8/1978 | United Kingdom | 297/250.1 |

*Primary Examiner*—Peter M. Cuomo
*Assistant Examiner*—David E. Allred
*Attorney, Agent, or Firm*—Hedman, Gibson & Costigan, P.C.

[57] ABSTRACT

A child safety seat is disclosed which is intended to be used in combination with a hard surface seating device. The safety seat comprises a flat panel of a fabric covered resilient element having an articulated joining portion which allows free movement of an upper section and a lower section of the flat panel. The upper section of the seat comprises an elongated upper torso support element that is designed to support the back of the child and extends upward to the area which would be contacted by the back of the head of a child and the lower section comprises a lower seating panel having integral leg support elements and a waist belt that may be adjustably connected to the elongated torso element and to the lower seating panel by a connecting element.

7 Claims, 2 Drawing Sheets

BABY SAFETY SEAT

BACKGROUND OF THE INVENTION

FIELD OF THE INVENTION

This invention relates to a transportable baby safety seat which is adapted to safely support infants and small children. The safety seat is intended for use when a child is placed in a hard seating device such as a shopping cart or a high chair. Supermarket shopping carts and high chair usually have seats which are sized to accommodate infants and small children but are not provided with any cushioning or with a supplemental restraining system that cooperates by a permanently attached safety belt to firmly yet comfortably support an infant or small child in the sitting position while protecting head, neck and back from injury.

Most modern supermarket shopping carts are provided with a foldable seat that is sized to accommodate small children. These seats are typically provided with two openings in the shopping cart that allow the child's legs to extend through the end panel of the shopping cart and a safety belt that is fastened about the child's waist to prevent the child from accidentally falling out of the shopping cart. These wire mesh carts may have a flat plastic seating panel but typically do not have any type of resilient cushioning to protect the child or enhance the comfort of the seated child. The lack of a comfortable seat exacerbates the discontent of most small children who are restrained or forced into involuntary inactivity.

In the prior art, seats which have been popularly called "infant seats", have been used to provide portable seating for infants and small children. These seats have typically been provided with a rigid supporting member and a form fitting cushion. The rigid support member is typically articulated in order to allow the seat to be adjusted from the upright sitting position to a reclining position. When the typical "infant seat" is carried around it provides a comfortable seat which provides adequate and safe support for infants and small children. Its principal deficiency is that it is too large to fit in the childs seat in a typical supermarket wire mesh shopping cart without tipping over. If it is placed side ways in the child's seat of a supermarket wire mesh shopping cart, it is not possible to properly engage the seat belts that are provided. Flexible infant carriers are known which have a plurality of straps to allow an adult to transport the infant without the use of the hands. These devices are not capable of providing a comfortable seat cushion and protective cushioning to the back, neck and head. Examples of prior devices and infant carrying and/or cushioning systems are found in U.S. Pat. Nos. 4,108,489: 5,121,965; 5,178,309: U.S. Pat. No. D296,370 and U.S. Pat. No. D342,835 all of which are incorporated by reference.

SUMMARY OF THE INVENTION

The present invention provides a child safety seat which is adapted to be used in combination with a hard surface seating means, said safety seat comprising a flat panel of a fabric covered resilient element having an articulated joining means which allows free movement of an upper section and a lower section of said flat panel. The upper section comprises an elongated upper torso support element that is designed to support the back of the child and extends upward to the area which would be contacted by the back of the head of a child. The lower section comprising a lower seating panel having integral leg support elements; a waist belt that may be adjustably connected to said elongated torso element to said lower seating panel by a connecting means.

Accordingly, it is a primary object of this invention to provide a safety seat cushion that is light in weight, easily transportable, and washable.

It is also a primary object of the invention to provide safe and comfortable seating in conjunction with rigid seating that is sized for infants and children.

It is also a primary object of this invention to provide a safety seat that has resilient cushioning and a restraint system that may be used in conjunction with the safety belts in supermarket shopping carts.

It is also a primary object of this invention to provide a safety seat that has resilient cushioning and a restraint system that may be used in conjunction with the safety belts in a high chair.

It is also an object of this invention to provide a safety seat cushion that may be used as a temporary body support or changing pad for infants and small children when it is necessary to place the infant or child in a prone position to facilitate the changing of diapers.

These and other objects of the invention will become apparent from a review of the appended specification.

DETAILED DESCRIPTION OF THE INVENTION

Figure 1:
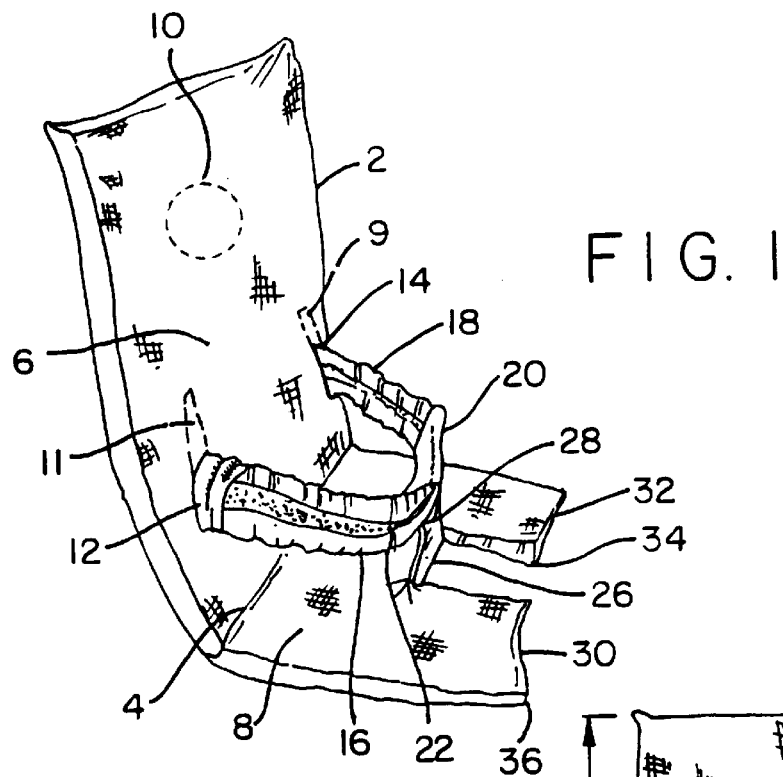
FIG. 1 is a perspective view of the safety seat of the invention.

As best seen in FIG. 1, the safety seat is made of one piece construction 2 and is articulated on a foldable crease zone 4. The upper torso section 6 is sized to extend from the seat supporting section 8 to an area which extends up to the area 10 which will contact the head of a child who voluntarily or involuntarily moves his or her head backwardly when in the sitting position. This safety feature will protect the childs head from any potentially injurious contact with any hard object that may be placed behind the head of the child.

The upper torso section 6 and the seat supporting section 8 is preferably about 2–3 cm. thick in order to accommodate a resilient inner element that provides support and cushioning for the safety seat.

Parallel slits 12 and 14 provide means to pass waist belt ends 16 and 18 through upper torso section 6 to the back of the upper torso section. In a preferred embodiment, the slits in the upper torso element are elongated to be about one and one-half to two times the width of the waist belt in order to allow the waist belt to be positioned at different vertical positions along the longitudinal axis of the waist belt in order to fit different size children or accommodate different seating situations. This feature is shown in FIG. 1 by the dotted lines that define element 9 and element 11. When this embodiment is selected, it allows one size of the safety seat be adjusted to accommodate the growing child during the age of infancy to about age three.

The waist belt ends are provided with adjustable connecting means which may be hook and eye (Velcro) type fasteners 23 and 24 which hold the ends of the waist belt together when both have been passed through sleeve 20. The dotted lines are used in FIG. 3 and FIG. 4 to show that either of the hook or eye fasteners are place on opposite sides of the waist belt in order to be positioned to engage the other member of the hook and eye type fastener system when the waist belt ends are joined. The waist belt may be made of one piece construction in order to provide the user with the option of fastening the ends together either in the front of the child as shown in FIG. 1 for clarity or more preferably in back of the child where it is more difficult for the child to release the waist belt. FIG. 4 shows an optional embodiment wherein the waist belt is an assembly which is provided in two pieces. Main waist belt 34 is long enough to be usable with an infant of from about six months to 9 months of age. Waist belt extender piece 36 may be affixed to main waist belt 36 by using the previously described hook and eye system (23 & 24) to extend the length of the main waist belt to accommodate an older infant or toddler. For comfort and appearance, the waist belt may be made of wide webbing that is of one or more layers of the same fabric as the exterior of the safety seat. These waist belts may be from 4.0 to 8.0 cm. wide although this dimension is not critical.

Figure 2:
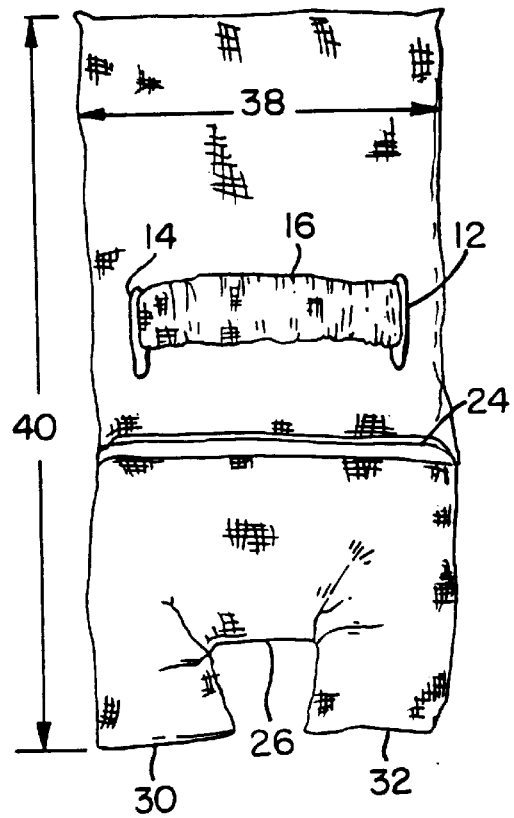
FIG. 2 is a back view of the safety seat of the invention in the open or unfolded position.

The overall dimensions for the safety seat in the open position as best shown in FIG. 2 are about 60 to 70 cm (40) by 28 to 32 cm. (38) for a 9–12 month old infant.

The sleeve 20 is attached to the seat supporting section 8 at the crotch cutout section 26 through connecting element 28. Crotch cutout section 26 provides an anchorage for the waist belt and also provides a restraint that prevents the child from slipping through the safety seat.

Leg extension elements 30 and 32 extend the lower end of the seat supporting section 8 to support and provide cushioning to the childs lower legs and feet. The embodiment of FIG. 1 shows the leg extension elements with square cut terminal sections 34 and 36 but it should be understood that these elements may be cut with round tips or as a segment of an oval section.

The safety seat is preferably made with an exterior cover which is made of a durable fabric that is smooth and non-abrasive. Washable fabrics are preferred but other woven or non-woven fabrics such as those made from natural or synthetic fibers or those made with plastic coatings or water resistant coatings may be employed. The exterior cover extends over and around the resilient inner element.

As best seen in FIG. 2 an optional opening 24 may be provided which is in register with foldable crease zone 4 on the front side of the safety seat. Optional opening 24 allows access to the interior padding of the safety seat to allow insertion and removal of a resilient element into the interior of the safety seat (not shown). The resilient element provides padding and structural support for the safety seat. The resilient element may be made from latex rubber or a suitable grade of polyurethane foam.

The resilient element is preferably made of a two piece construction; one piece is sized to fit within upper torso section 6 and the other piece is sized to fit within seat support section 8.

When the seat requires cleaning, the resilient elements may be withdrawn and the fabric member may be laundered or if appropriate, dry-cleaned. While the preferred embodiment has a removable resilient element, the invention also includes a safety seat having a sealed non-removable covering over the resilient element.

Figure 3:
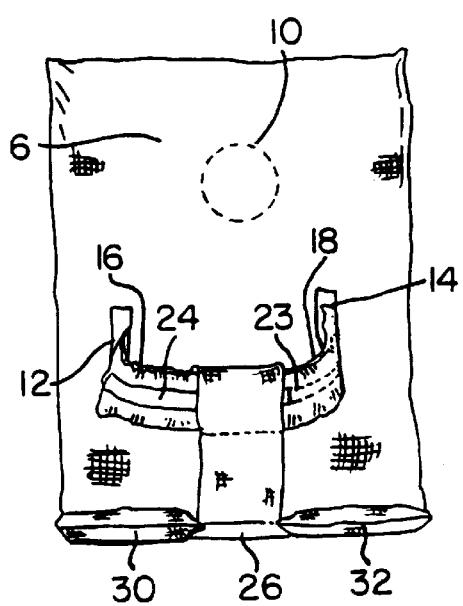
FIG. 3 is a front view of the safety seat of the invention in the open or unfolded position.
Figure 4:
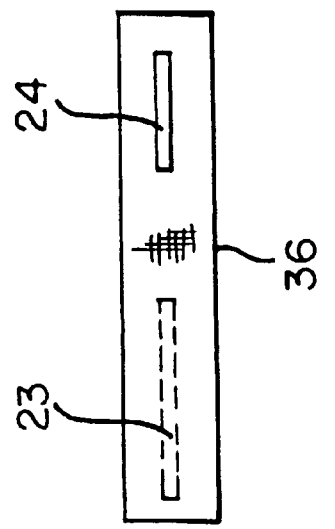
FIG. 4 is a top plan view of the waist belt and strap extender which is used to secure the child in the safety seat.
Figure 4:
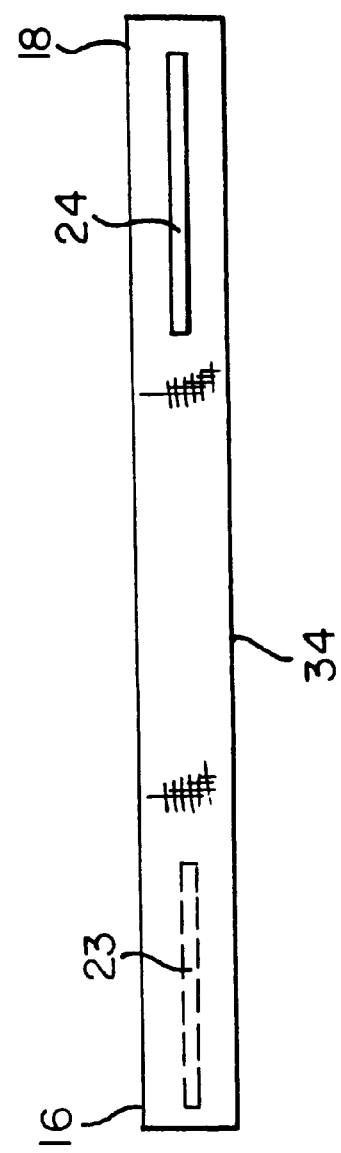

As best shown in FIG. 3, the front view of an embodiment of the safety seat shows the straps 16 and 18 fastened through sleeve 20. The hook section of the fastener 24 is shown on the front side of strap side 14 and the eye portion 23 is shown by dotted lines on the reverse side of strap side 16.

The invention has been described with a detailed description of the preferred embodiment. It should be noted the invention is not limited to the preferred embodiment and that variations and modifications of the preferred embodiment are within the scope of the invention.

I claim:

1. A child safety seat which is adapted to be used in combination with a hard surface seating means, said safety seat comprising a flat panel which is a fabric covered resilient element having an articulated joining means which allows free movement of an upper section and a lower section of said flat panel, said fabric covered resilient element having an opening which allows for the insertion and removal of said resilient element, said upper section comprising an elongated upper torso support element that is designed to support the back of a child and extends up and includes an area adapted to contact the back of a head of a child, said lower section comprising a lower seating panel having separate integral leg support elements that are sized to support a childs legs and are spaced apart from one another to define an opening; a waist belt that may be adjustably connected to said elongated upper torso element through slits in said elongated upper torso element, said waist belt being connected to said lower seating panel at said opening between said integral leg support elements by a sleeve element that is sized to hold said waist belt and a connecting element which is attached to said lower seating panel.

2. A child safety seat which is adapted to be used in combination with a hard surface seating means as defined in claim 1 wherein the waist belt includes means for adjustably connecting said waist belt around a child in order to secure said waist belt in back of the child.

3. A child safety seat which is adapted to be used in combination with a hard surface seating means as defined in claim 1 wherein the resilient element comprises two pieces; one piece being sized to fit the upper torso element and one piece being sized to fit the lower seating panel.

4. A child safety seat which is adapted to be used in combination with a hard surface seating means as defined in claim 1 wherein said waist belt comprises two pieces: the first piece being a main waist belt having hooks and eyes to provide connecting means and a second piece which is a waist belt extender piece having hooks and eyes to provide connecting means to attach said waist belt extender piece to said main waist belt.

5. A child safety seat as defined in claim 1 wherein said safety seat is adapted to be used in conjunction with the upper section of a supermarket shopping cart.

6. A child safety seat which is adapted to be used in combination with a hard surface seating means, said safety seat comprising a flat panel which is a fabric covered resilient element having an articulated joining means which allows free movement of an upper section and a lower section of said flat panel, said fabric covered resilient element having an opening which allows for the insertion and removal of said resilient element, said upper section comprising an elongated upper torso support element that is designed to support the back of a child and extends up and includes an area adapted to contact substantially all of the area of the back of the head of a child, said lower section comprising a lower seating panel having separate integral leg support elements that are sized to support a childs legs and are spaced apart from one another to define an opening;

a waist belt that may be adjustably connected to said elongated torso element and to said lower seating panel by a connecting means, said waist belt being connected to said lower seating panel by a sleeve element which engages said waist belt and is attached to a connecting element that is attached to said lower seating panel at a point between said separate integral leg support elements, said waist belt being connected to said elongated upper torso element through slits in said elongated upper torso element that are located at waist height and allow free movement of the waist belt along the longitudinal axis of the waist belt said slits in said elongated upper torso element being elongated to be one and one-half times the width of the waist belt in order to allow the waist belt to be positioned at different vertical positions.

7. A child safety seat which is adapted to be used in combination with a hard surface seating means, said safety seat which consists essentially of a flat panel which is a fabric covered resilient element having an articulated joining means which allows free movement of an upper section and a lower section of said flat panel, said fabric covered resilient element having an opening which allows for the insertion and removal of said resilient element, said upper section comprising an elongated upper torso support element that is designed to support the back of a child and extends upward to the area which would be contacted by the back of the head of a child, said lower section comprising a lower seating panel having separate integral leg support elements for supporting a childs lower legs and feet said leg elements being spaced apart from one another to define an opening; a waist belt that may be adjustably connected to said elongated torso element and to said lower seating panel by a connecting means, said waist belt being connected to said lower seating panel at a point between said separate integral leg support elements by a sleeve element that is sized to hold said waist belt and a connecting element which is attached to said lower seating panel.

* * * * *